(12) United States Patent
Kudo (10) Patent No.: US 8,302,984 B2
(45) Date of Patent: Nov. 6, 2012

(54) SIDE STAND ATTACHING STRUCTURE FOR MOTORCYCLE, MOTORCYCLE AND METHOD FOR ATTACHING LEVELABLE SIDE STAND TO MOTORCYCLE

(75) Inventor: Takashi Kudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 501 days.

(21) Appl. No.: 12/372,037

(22) Filed: Feb. 17, 2009

(65) Prior Publication Data

US 2009/0212532 A1 Aug. 27, 2009

(30) Foreign Application Priority Data

Feb. 26, 2008 (JP) ................................. 2008-044593

(51) Int. Cl.
*B62H 1/02* (2006.01)

(52) U.S. Cl. ........................ 280/301; 280/293; 280/763.1

(58) Field of Classification Search .................. 280/301, 280/763.1, 293, 298; 29/525.01
See application file for complete search history.

(56) References Cited

U.S. PATENT DOCUMENTS

| | | | | | |
|---|---|---|---|---|---|
| 456,411 | A | * | 7/1891 | Hathaway | 280/301 |
| 555,024 | A | * | 2/1896 | Ruffhead | 280/301 |
| 670,125 | A | * | 3/1901 | Williams | 280/296 |
| RE16,321 | E | * | 4/1926 | Henderson | 280/301 |
| 2,020,904 | A | * | 11/1935 | Pawsat | 280/301 |
| 2,479,763 | A | * | 8/1949 | Morris | 280/301 |
| 2,486,583 | A | * | 11/1949 | Walklet | 280/301 |
| 2,672,352 | A | * | 3/1954 | Shobe | 280/301 |
| 3,275,339 | A | * | 9/1966 | Mennesson | 280/281.1 |
| 4,073,505 | A | * | 2/1978 | Yamazaki | 280/301 |
| 4,084,656 | A | * | 4/1978 | Itoh et al. | 180/219 |
| 4,241,933 | A | * | 12/1980 | Gratza et al. | 280/301 |
| 4,417,746 | A | * | 11/1983 | Baron | 280/301 |
| 4,445,705 | A | * | 5/1984 | Hayashi et al. | 280/302 |
| 4,556,230 | A | * | 12/1985 | Diekman | 280/301 |
| 4,671,374 | A | * | 6/1987 | Kouyama et al. | 180/219 |
| 4,971,347 | A | * | 11/1990 | Cline | 280/301 |
| 6,918,607 | B2 | * | 7/2005 | Nakazawa et al. | 280/301 |
| 7,451,994 | B2 | * | 11/2008 | Heitner | 280/304.3 |
| 7,575,245 | B2 | * | 8/2009 | Chuang | 280/301 |
| 8,003,903 | B2 | * | 8/2011 | Nakazawa et al. | 200/61.58 R |
| 2008/0157503 | A1 | * | 7/2008 | Imai | 280/301 |

FOREIGN PATENT DOCUMENTS

| | | |
|---|---|---|
| JP | 50-106364 | 8/1975 |
| JP | 58-43580 U | 3/1983 |
| JP | 64-30787 U | 2/1989 |

* cited by examiner

*Primary Examiner* — Tashiana Adams
*Assistant Examiner* — Maurice Williams
(74) *Attorney, Agent, or Firm* — Ditthavong Mori & Steiner, P.C.

(57) ABSTRACT

A side stand attaching structure for a motorcycle includes a stand attaching part of a body of the motorcycle, a stand bracket, and a connector. The stand bracket rotatably connects a base end part of a levelable side stand to the stand attaching part. The side stand is provided on one side at a lower part of the body. The connector connects the stand bracket to the stand attaching part. The connector is inclined to extend upward as the connector extends outwardly in a width direction of the motorcycle.

18 Claims, 5 Drawing Sheets

SIDE STAND ATTACHING STRUCTURE FOR MOTORCYCLE, MOTORCYCLE AND METHOD FOR ATTACHING LEVELABLE SIDE STAND TO MOTORCYCLE

CROSS-REFERENCE TO RELATED APPLICATIONS

The present application claims priority under 35 U.S.C. §119 to Japanese Patent Application. No. 2008-044593, filed Feb. 26, 2008. The contents of this application are incorporated herein by reference in their entirety.

BACKGROUND OF THE INVENTION

1. Field of the Invention

The present invention relates to a side stand attaching structure for a motorcycle, a motorcycle and a method for attaching a levelable side stand to a motorcycle.

2. Discussion of the Background

Conventionally, a motorcycle has generally been provided with a side stand on the left side of a lower part of a body frame (refer to, for example, Japanese Patent Laid-open No. Sho 50-106364, Japanese Utility Model Laid-open No. Sho 58-43580, and Japanese Utility Model Laid-open No. Sho 64-30787). In this case, taking sport running in a circuit or the like into consideration, a configuration may be contemplated in which, as described in Japanese Utility Model Laid-open No. Sho 64-30787, a stand bracket is fixed to the body frame by fastening a bolt or bolts and the stand bracket can be attached and detached together with the side stand, as required.

The contents of Japanese Patent Laid-open No. Sho 50-106364, Japanese Utility Model Laid-open No. Sho 58-43580 and Japanese Utility Model Laid-open No. Sho 64-30787 are incorporated herein by reference in their entirety.

It is desirable that an operation of fastening the above-mentioned stand bracket can be carried out on a lateral side of the vehicle body, for avoiding the interference of the tool with an engine mounted on the inside of the body frame or for the like reasons.

According to the configuration described in Japanese Utility Model Laid-open No. Sho 64-30787, however, the stand bracket is fastened to a stand attaching part of the body frame substantially from just the lateral side. Therefore, the stand bracket and a base end part of the side stand are liable to be located below the stand attaching part of the body frame, possibly exerting an influence of the bank angle of the vehicle body.

SUMMARY OF THE INVENTION

According to one aspect of the present invention, a side stand attaching structure for a motorcycle includes a stand attaching part of a body of the motorcycle, a stand bracket, and a connector. The stand bracket rotatably connects a base end part of a levelable side stand to the stand attaching part. The side stand is provided on one side at a lower part of the body. The connector connects the stand bracket to the stand attaching part. The connector is inclined to extend upward as the connector extends outwardly in a width direction of the motorcycle.

According to another aspect of the present invention, a motorcycle includes a body, a levelable side stand, a stand bracket, and a connector. The body has a stand attaching part. The levelable side stand is provided on one side at a lower part of the body and has a base end part. The stand bracket rotatably connects the base end part of the side stand to the stand attaching part. The connector connects the stand bracket to the stand attaching part. The connector is inclined to extend upward as the connector extends outwardly in a width direction of the motorcycle.

According to further aspect of the present invention, a method for attaching a levelable side stand to a motorcycle includes connecting a stand bracket to a stand attaching part of a body of the motorcycle via a connector. The connector is arranged to incline so that the connector extends upwardly as the connector extends outwardly in a width direction of the motorcycle. The base end part of the side stand is rotatably connected to the stand bracket. The side stand is provided on one side at a lower part of the body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Embodiments will now be described with reference to the accompanying drawings, wherein like reference numerals designate corresponding or identical elements throughout the various drawings.

Now, an embodiment of the present invention will be described below referring to the drawings. Incidentally, the front, rear, left, right and the like sides in the following description are the same as those in the vehicle, unless otherwise specified. Besides, arrow FR in the drawings indicate the front side of the vehicle, arrow LH the left side of the vehicle, and arrow UP the upper side of the vehicle.

Figure 1:
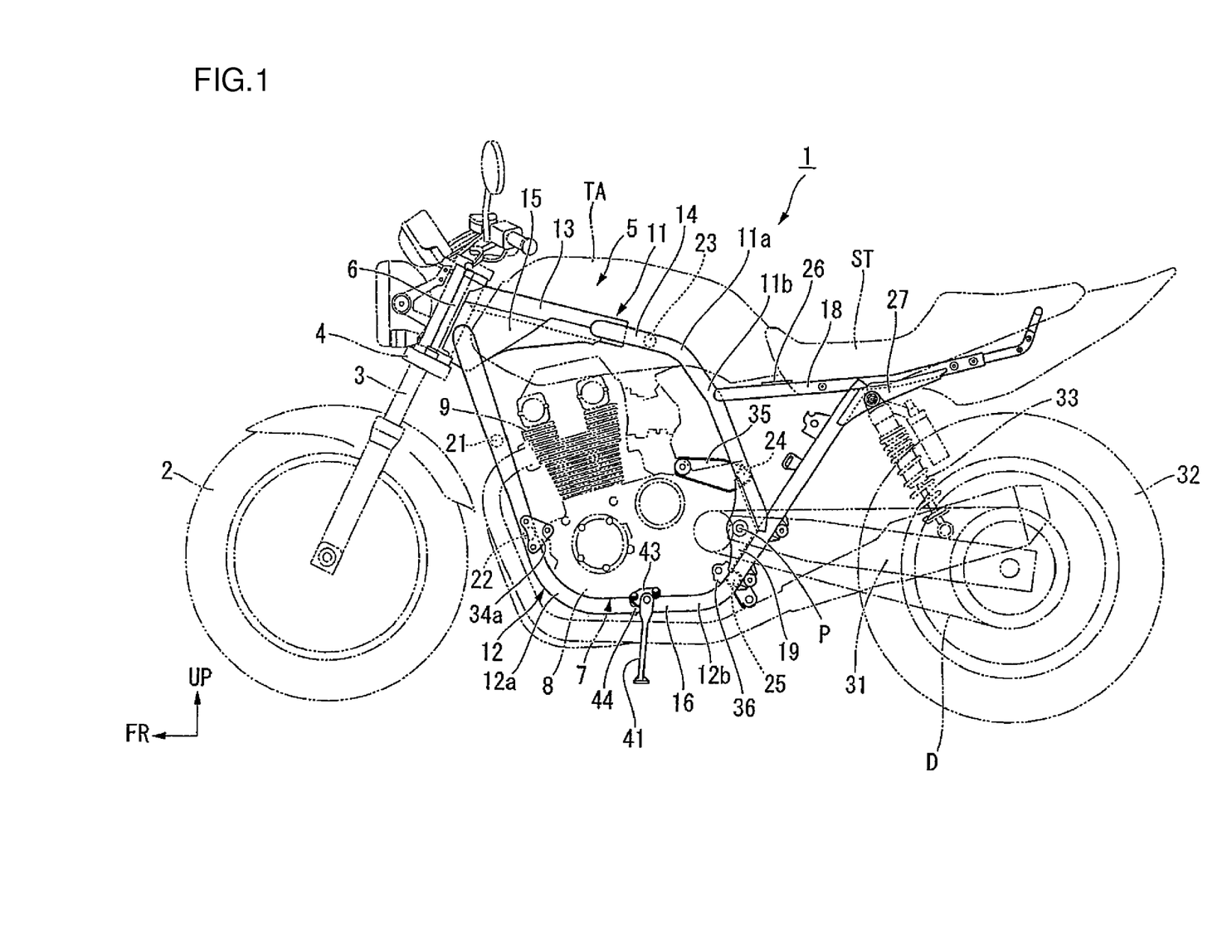
FIG. 1 is a left side view of a motorcycle in an embodiment of the present invention.

In a motorcycle (saddle ride type vehicle) 1 shown in FIG. 1, a front wheel 2 as a steering wheel is rotatably supported on lower end parts of left and right front forks 3, and upper parts of the left and right front forks 3 are steerably supported on a head pipe 6 of a body frame 5 through a steering stem 4. The body frame 5 is formed by integrally connecting a plurality of kinds of steel members by welding or the like, and is formed to be of the so-called cradle type surrounding an engine (internal combustion engine) 7 located substantially in the center of the vehicle body.

Figure 2:
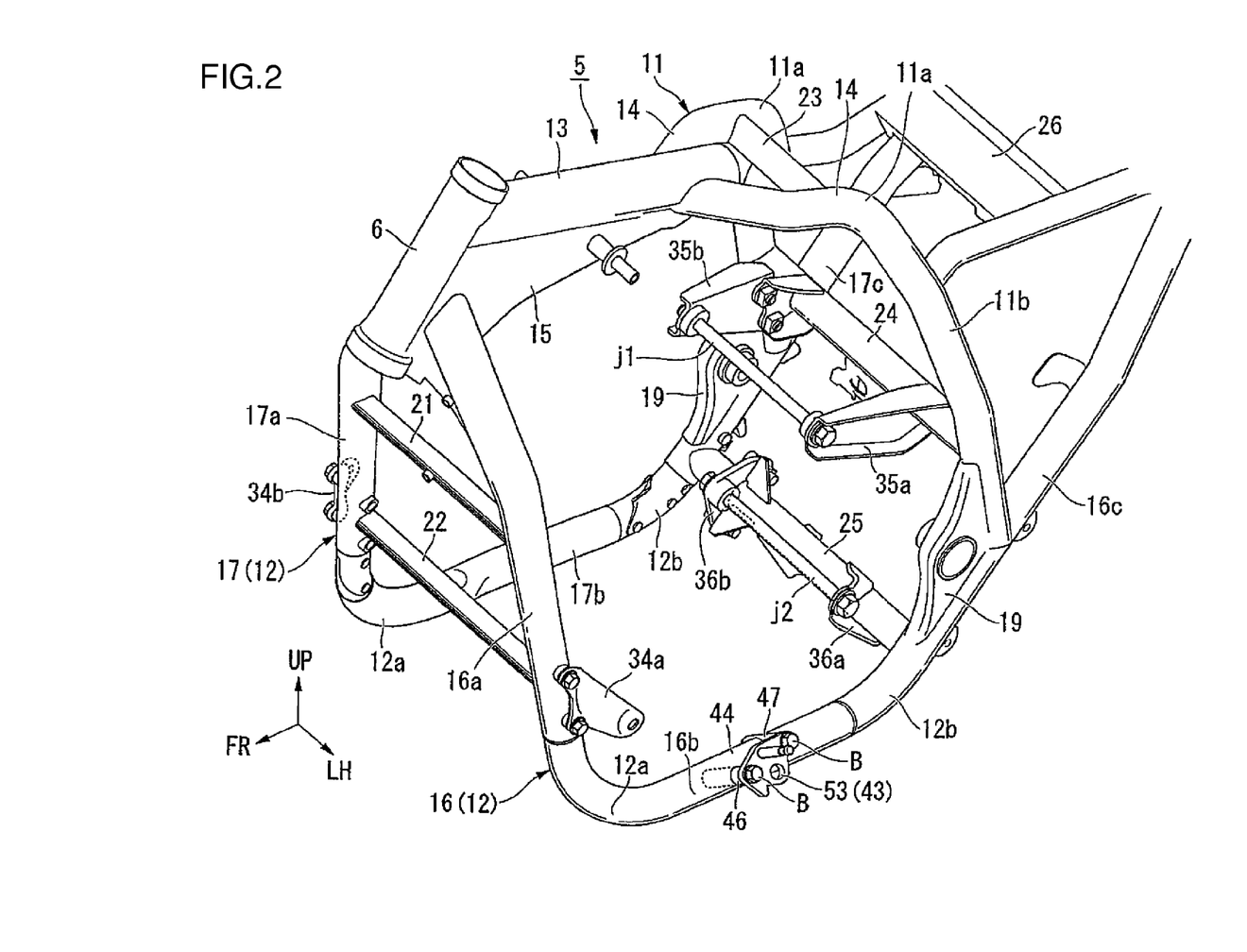
FIG. 2 is a perspective view, from the left front upper side, of a body frame of the motorcycle.

Referring to FIG. 2 also, the body frame 5 includes a main frame part 11 extending so as to come from the upper side round to the rear side of the engine 7, and a down frame part 12 extending so as to come from the front side round to the lower side of the engine 7.

The main frame part 11 extends from an upper part of the head pipe 6 toward a lower rear side at a comparatively gentle inclination, is then bent downward through first and second bent parts 11a, 11b, and extends toward a rear lower side at a comparatively steep inclination. The first bent part 11a, on the head pipe 6 side, of the main frame part 11 is greater in bend angle than the second bent part 11b on the rear (lower) side thereof. A portion, ranging from the head pipe 6 to a point just on the front side of the first bent part 11a, of the main frame part 11 is composed of a single front main pipe 13; on the other hand, a portion, on the rear side of the front main pipe 13, of the main frame part 11 is composed of a left-right pair of center main pipes 14.

The front main pipe 13 is produced by forming a round steel pipe with a comparatively large diameter into a rectilinear shape, and a front end part thereof is abutted on and integrally welded to the rear side of an upper part of the head pipe 6.

On the other hand, the left and right center main pipes 14 are produced by appropriately bending round steel pipes with a comparatively small diameter, are so disposed that the spacing between the left and right center main pipes 14 is enlarged as one goes toward the rear side, their portions on the front side of the first bent parts 11a are bent toward the inner side in the left-right direction, and their front end parts are skewly abutted on and integrally welded to both sides of a rear part of the front main pipe 13, respectively.

A head pipe gusset 15 is provided on the lower side of the front main pipe 13, and the head pipe gusset 15 is bridgingly and integrally welded to a lower part of the front main pipe 13 and to the rear side of a lower part of the head pipe 6.

The down frame part 12 extends from the vicinity of a lower part of the head pipe 6 toward a rear lower side at a comparatively steep inclination, is then rearwardly bent at the front curbed part 12a at a lower part of the vehicle body, extends substantially horizontally (specifically, somewhat rearwardly upward) toward the rear side, is upwardly bent at the rear bent part 12b, and extends toward a rear upper side. The down frame part 12 as just-described is composed of a left-right pair of down pipe assemblies 16, 17.

The left and right down pipe assemblies 16, 17 are each formed mainly by appropriately bending a round steel pipe, and are disposed on the outermost sides of the body frame 5 by securing a wide spacing between them in the left-right direction. Front parts of the left and right down pipe assemblies 16, 17 are bent toward the inner side in the left-right direction, and upper end parts of the down pipe assemblies 16, 17 are skewly abutted on and integrally welded to both sides of a lower part of the pipe gusset 15, respectively.

On the other hand, rear parts of the left and right down pipe assemblies 16, 17 extend to intermediate parts in the front-rear direction of left and right rear upper pipes 18 located in the vicinity of a bottom plate of the rider seat ST to support the bottom plate, are then bent toward the inner side in the left-right direction in the vicinity of the intermediate parts, and upper end parts of the rear parts are skewly abutted on and integrally welded to the lower sides of the intermediate parts, respectively. Front end parts of the left and right rear upper pipes 18 are abutted on and integrally welded to the rear sides of the second bent parts 11b of the left and right center main pipes 14. Incidentally, symbol TA in the figure denotes a fuel tank located on the front side of the seat ST and supported by the main frame part 11.

Here, the left down pipe assembly 16 is divisionally composed of a portion (left front down pipe 16a) ranging from the head pipe gusset 15 to a point immediately on the front side of the front bent part 12a, a portion (left lower pipe 16b) ranging from the just-mentioned portion to a point immediately on the front side of the rear bent part 12b, and a portion (left rear down pipe 16c) ranging from the just-mentioned portion to the left rear upper pipe 18, the three portions being integrally welded to each other at the dividing positions.

On the other hand, the right down pipe assembly 17 is divisionally composed of a portion (right front down pipe 17a) ranging from the head pipe gusset 15 to a point immediately on the front side of the front bent part 12a, a portion (right lower pipe 17b) ranging from the just-mentioned portion to an intermediate part of the rear bent part 12b, and a portion (right rear down pipe 17c) ranging from the just-mentioned portion to the left rear upper pipe 18, the three portions being detachably bolt connected to each other at the dividing positions.

Lower end parts of the left and right center main pipes 14 are skewly abutted, from the front side, on and integrally welded to portions, a little spaced from the rear bent parts 12b toward a rear upper side, of the left and right down pipe assemblies 16, 17. Left and right pivot gussets 19 are provided respectively on the front side of lower end parts of the left and right center main pipes 14, and the left and right pivot gussets 19 are integrally bridgingly welded to both the front side of the lower end parts of the left and right center main pipes 14 and the front side of portions, on the upper side of the rear bent parts 12b, of the left and right down pipe assemblies 16, 17.

The cradle type body frame 5 is formed mainly with the above-mentioned configuration, and the engine 7 is mounted on the inside of the body frame 5.

Incidentally, in the figure, symbols 21, 22 denote a front middle cross pipe and a front lower cross pipe extending along the left-right direction bridgingly between vertically intermediate parts and lower parts of the left and right front down pipes 16a, 17a. Symbols 23, 24 denote a front cross pipe and a center cross pipe extending along the left-right direction bridgingly between front parts and lower parts of the left and center main pipes 14. Symbol 25 denotes a lower cross pipe extending along the left-right direction bridgingly between portions, immediately on the rear upper side of the rear bent parts 12b, of the left and right down pipe assemblies 16, 17. Symbol 26 denotes a center cross pipe extending along the left-right direction bridgingly between front parts of the left and right rear upper pipes 18. Symbol 27 denotes left and right rear cushion gussets bridgingly provided between the rear side of upper end parts of the left and right rear down pipes 16c, 17c and the lower side of intermediate parts in the front-rear direction of the left and right rear upper pipes 18.

Referring to FIG. 1, left and right end parts of a pivot shaft P for supporting front end parts of the swing arm 31 are supported respectively on vertically intermediate parts of the left and right pivot gussets 19. A rear wheel 32 as a drive wheel is rotatably supported on rear end parts of left and right arms of the swing arm 31. Left and right rear cushion units 33 are interposed respectively between rear parts of the left and right arms of the swing arm 31 and the left and right rear cushion gussets 27.

The engine 7 is a parallel 4-cylinder engine with its crankshaft set in the left-right direction (vehicle width direction), for example, and cylinders 9 are erectly arranged on the upper side of front parts of the crankcase 8. The crankshaft is contained in a front part of the crankcase 8, and a transmission is contained in a rear part of the crankcase 8. The output of the engine 7 is transmitted, for example, from the left side of the crankcase 8 to the rear wheel 32 through a chain drive type power transmission mechanism D.

Of the engine 7, a front end part of the crankcase 8 is supported on front parts of the left and right down pipe assemblies 16, 17 through left and right front engine hangers 34a, 34b, the upper side of a rear part of the crankcase 8 is supported on the center cross pipe 24 through left and right rear upper engine hangers 35a, 35b, and the lower side of a rear end part of the crankcase 8 is supported on the lower cross pipe 25 through left and right rear lower engine hangers 36a, 36b.

The left and right front engine hangers 34a, 34b are detachably bolt connected to the left and right down pipe assemblies 16, 17, respectively. On the other hand, the left rear upper engine hanger 35a and the left rear lower engine hanger 36a are welded respectively to the center cross pipe 24 and the lower cross pipe 25, and the right rear upper engine hanger 35b and the right rear lower engine hanger 36b are detachably bolt connected to the center cross pipe 24 and the lower cross pipe 25, respectively. Incidentally, symbols j1 and j2 in the figure denote engine mount shafts bridgingly extending between the left and right rear upper engine hangers 35a, 35b and between the left and right rear lower engine hangers 36a, 36b.

Here, a levelable type side stand 41 for supporting the vehicle body of the motorcycle 1 in the state of being inclined to the left side is attached to an intermediate part in the front-rear direction of a lower side part (left lower pipe 16b) of the left down pipe assembly 16.

Figure 3:
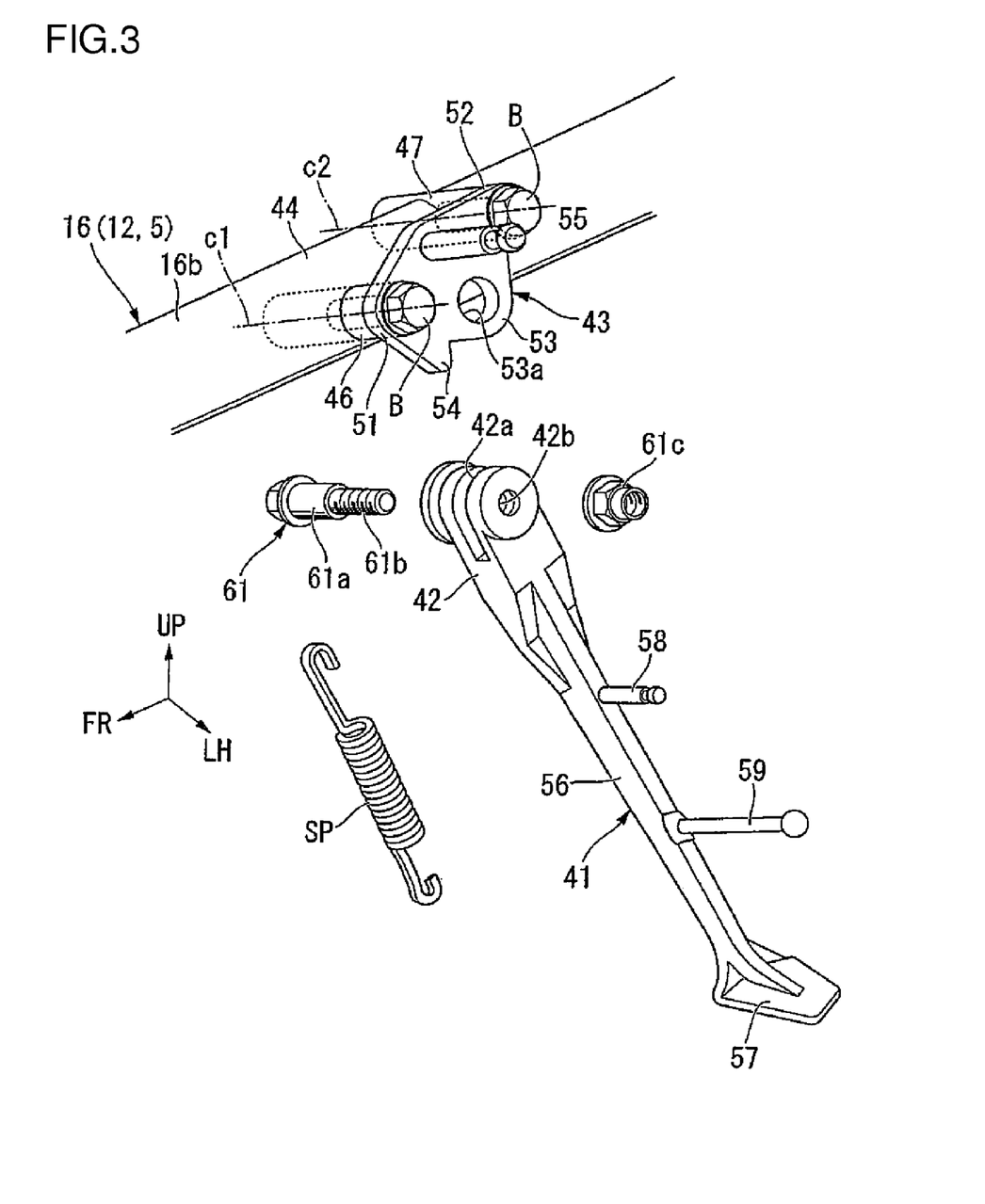
FIG. 3 is an exploded perspective view of a side stand to be attached to the left side of a lower part of the body frame.

Referring to FIG. 3, the side stand 41 is bar-like in shape, and a base end part 42 thereof is provided with an insertion groove 42a in which a stand supporting part 53 of a thick plate-like stand bracket 43 can be inserted. The stand bracket 43 is detachably attached to a stand attaching part 44, which is provided at an intermediate part in the front-rear direction of the left lower pipe 16b, by use of a front-rear pair of fastening bolts B. The stand supporting part 53 of the stand bracket 43 is inserted in the insertion groove 42a and they are connected through a turning shaft (for example, a stepped bolt 61 to be described later), whereby the side stand 41 is turnably attached to the stand attaching part 44 of the body frame 5 through the stand bracket 43.

Figure 4:
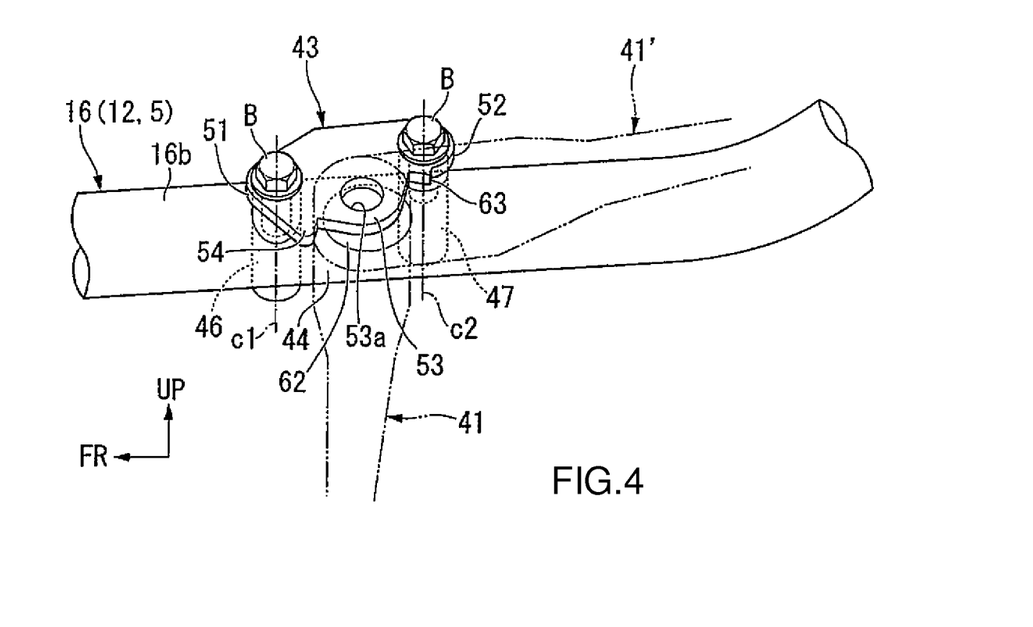
FIG. 4 is a left side view of a stand attaching part on the left side of the lower part of the body frame.
Figure 5:
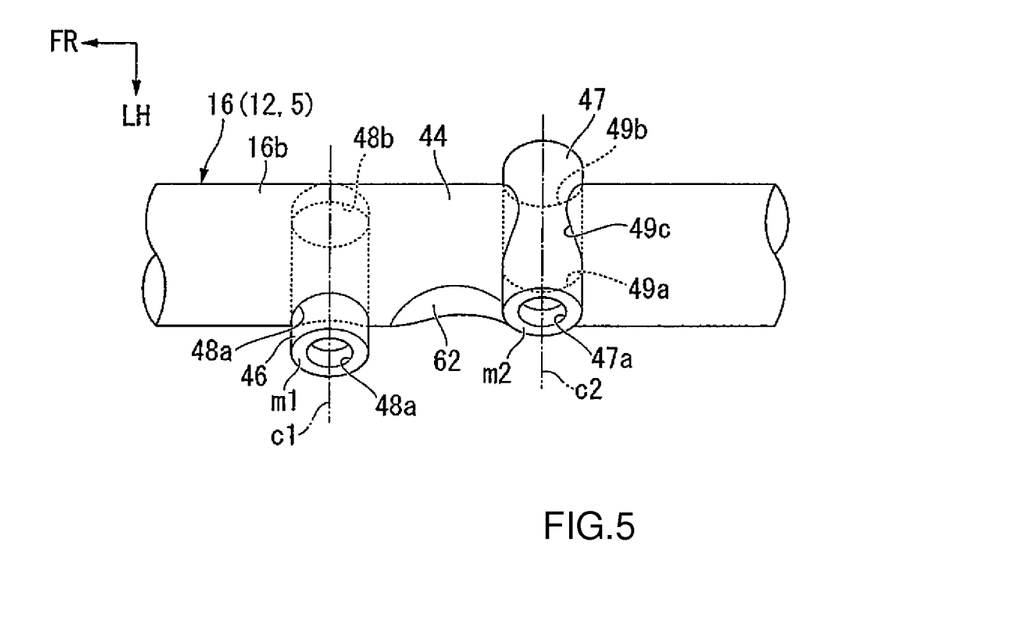
FIG. 5 is a top view of the stand attaching part.
Figure 6:
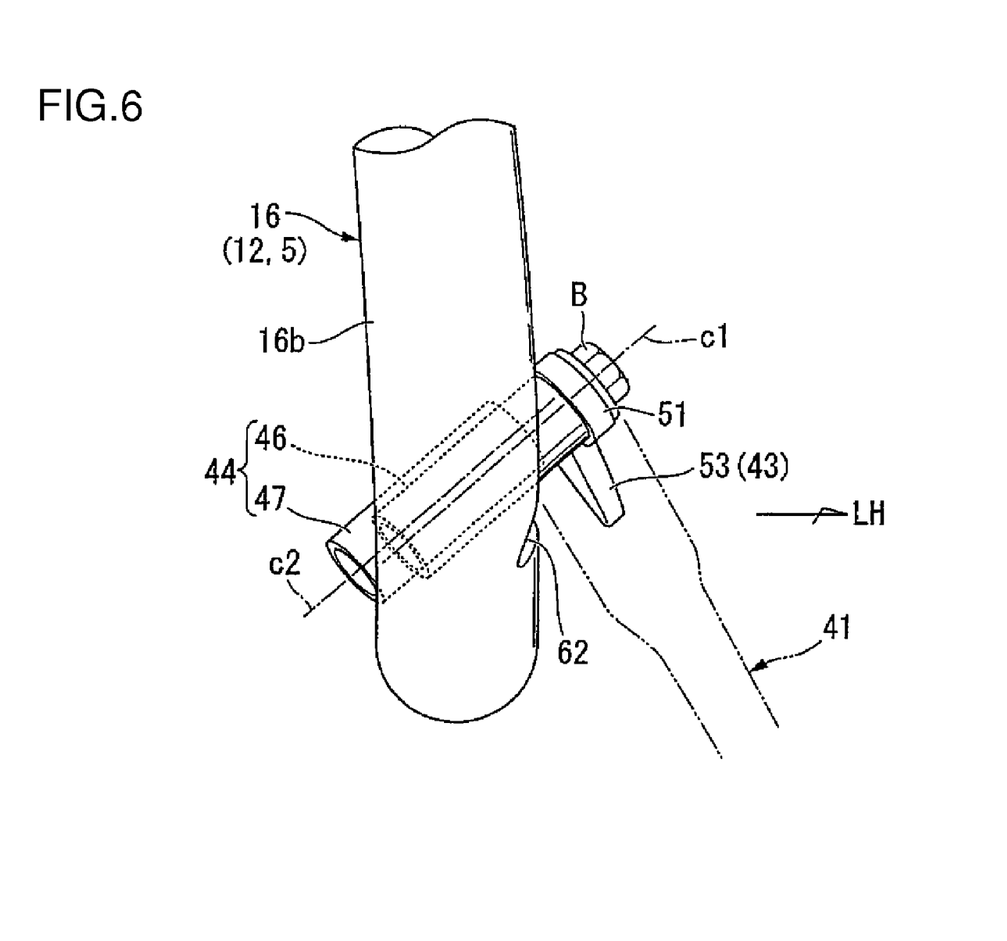
FIG. 6 is a front view, as viewed slightly upwards, of the stand attaching part.

Referring to FIGS. 4 to 6 also, the stand attaching part 44 has a structure in which a front-rear pair of bosses 46, 47 are firmly provided at an intermediate part in the front-rear direction of the left lower pipe 16b.

The front boss 46 is hollow cylindrical in shape, is provided so as to penetrate a central part of section of the left lower pipe 16b along the radial direction of the latter, and is provided in the state of being inclined leftwardly upwards so as to be located on the more upper side as one goes toward the outer side in the vehicle width direction (the outer side in the left-right direction, i.e., the left side in this embodiment).

On the other hand, the rear boss 47 is also hollow cylindrical in shape in the same manner as the front boss 46, is disposed at a position on an upper rear side of the front boss 46 in parallel to the latter, and is so provided as to penetrate a portion, on the upper side relative to the central part of section, of the left lower pipe 16b at a leftwardly upward inclination. Hereinafter, the center axes of the front and rear bosses 46 and 47 will be denoted by c1 and c2, respectively.

Referring to FIG. 5, end faces m1 and m2 on the outer side in the left-right direction of the front and rear bosses 46 and 47 are on the same plane, and the inner peripheral parts at least on the outer side in the left-right direction of the front and rear bosses 46, 47 are made to be nut holes 46a, 47a provided with female screws.

The left lower pipe 16b is provided, on the front side of the stand attaching part 44, with a circular hole 48a opened to an upper and outer side in the left-right direction so as to penetrate the stand attaching part 44 along the axis c1 and with a circular hole 48b opened to a lower and inner side in the left-right direction, and edge parts of the holes 48a, 48b and the outer peripheries of both end parts of the front boss 46 are welded to each other over the whole circumferences.

On the other hand, on the rear side of the stand attaching part 44, a circular hole 49a opened to an upper and outer side in the left-right direction so as to penetrate the stand attaching part 44 along the axis c2 and a circular hole 49b opened to a lower and inner side in the left-right direction are formed, and a cutout 49c providing connection between upper parts of the circular holes 49a and 49b is formed. Edge parts of the holes 49a, 49b and the cutout 49c and outer peripheries of both end parts and an upper part of the rear boss 47 are continuously welded to each other, respectively.

Referring to FIGS. 3 and 4, the stand bracket 43 is made to be a flat plate-like in shape so that it is planar as a whole. The stand bracket 43 is provided at its front and rear end parts with front and rear fastening parts 51, 52 in which underhead parts of the fastening bolts B can be inserted. Surfaces on the inner side in the left-right direction of the front and rear fastening parts 51, 52 are abutted on the end faces m1, m2 on the outer side in the left-right direction of the front and rear bosses 46, 47, the underhead parts of the fastening bolts B are inserted into the front and rear fastening parts 51, 52 from the outer side in the left-right direction, and the fastening bolts B are screw engaged with the nut holes 46a, 47a of the front and rear bosses 46, 47, whereby the stand bracket 43 is integrally fastened and firmly attached to the stand attaching part 44. In this case, the stand bracket 43 is disposed to be orthogonal to the front and rear bosses 46, 47.

The stand bracket 43 is provided, on the lower side of its intermediate part in the front-rear direction, with the above-mentioned stand supporting part 53 bulged downwards in a semi-circular shape in plan view. The stand supporting part 53 is provided in its central part with an insertion hole 53a which is circular in plan view and in which to insert the above-mentioned turning shaft. On the lower side of a front part of the stand bracket 43, a front stopper piece 54 is downwardly projectingly provided which abuts on the base end part 42 at the time of erection of the side stand 41 so as to restrict the turning of the side stand 41 in the erecting direction. On the upper side of an intermediate part in the front-rear direction of the stand bracket 43, an upper lock pin 55 is outwardly (in the left-right direction) projectingly provided which locks an upper end part of a stand spring (tensile coil spring) SP for holding the side stand 41 in an erect state or a stored state (shown in FIG. 3 only).

Referring to FIG. 3, the side stand 41 includes the base end part 42 to be provided with the insertion groove 42a, an arm part 56 extending rectilinearly from the base end part 42, and a grounding part 57 projecting from a tip part of the arm part 56 toward the outer side in the left-right direction, the three parts being formed as one body. In the base end part 42, an insertion hole 42b which is circular in plan view and in which to insert the above-mentioned turning shaft is formed so as to penetrate the insertion groove 42a.

In attaching the side stand 41, the stand supporting part 53 of the stand bracket 43 is inserted and fitted into the insertion groove 42a in the base end part 42, and, in this condition, the turning shaft is inserted in both the insertion holes 42b and 53a so as to penetrate these members, whereby the base end part 42 of the side stand 41 is turnably connected to and supported on the stand supporting part 53 of the stand bracket 43 through the turning shaft.

At an intermediate part in the longitudinal direction of the side stand 41, a lower lock pin 58 for locking a lower end part of the stand spring SP is provided to project toward the outer side in the left-right direction. In addition, on the lower side of the lower lock pin 58, a foot hook pin 59 for permitting the side stand 41 to be turned by the rider's foot is provided to project toward the outer side in the left-right direction.

Referring to FIGS. 4 and 6, the side stand 41 extends from the stand supporting part 53 (the base end part 42) toward a lower and outer side in the left-right direction so as to project more to the outer side in the left-right direction at a position nearer to its tip, at the time of use (at the time of erection) thereof. On the other side, at the time of non-use (storage, as indicated by symbol 41' in FIG. 4) thereof, the side stand 41 is folded so that it extends rearwards along the front-rear direction from the stand supporting part 53 (the base end part 42) and that the projection toward the outer side in the left-right direction is suppressed.

Referring to FIG. 3, the turning shaft penetrating the base end part 42 of the side stand 41 and the stand supporting part 53 of the stand bracket 43 is provided in the state of being inclined leftwardly upwards so as to be located on the more upper side as one goes toward the outer side in the left-right direction (the outer side in the vehicle width direction). The turning shaft is disposed to be orthogonal to the flat plate-like stand bracket 43. In other words, the turning shaft and the front and rear bosses 46, 47 are disposed in parallel to each other.

The turning shaft is composed as a stepped bolt 61, for example. Of the stepped bolt 61, an underhead part having a shaft part 61a on the base end side is inserted into the insertion holes 42b, 53a from, for example, the inner side in the left-right direction, a screw shaft 61b on the underhead part tip side is projected toward the outer side in the left-right direction of the base end part 42 and the stand supporting part 53, and a nut 61c is screw-engaged with the screw shaft 61b and tightened, whereby the base end part 42 of the side stand 41 is connected to and supported on the stand supporting part 53 of the stand bracket 43 so as to be turnable about the shaft part 61a.

Here, referring to FIGS. 4 and 5, the stand attaching part 44 of the left lower pipe 16b is provided with a recess 62 between the front and rear bosses 46 and 47 so that the stand bracket 43 can be located close to the stand attaching part 44 while avoiding the head part of the stepped bolt 61 projecting toward the inner side in the left-right direction of the stand bracket 43.

Referring to FIGS. 3 and 4, when the side stand 41 is erected, a front surface, near the bottom part of the insertion groove 42a, of the base end part 42 abuts on a rear surface of the front stopper piece 54, whereby the turning of the side stand 41 in the erecting direction is restricted.

On the other hand, when the side stand 41 is stored, a rear surface (upper surface), near the bottom part of the insertion groove 42a, of the base end part 42 abuts on a rear stopper part 63 (see FIG. 4) formed in a stepped shape at a lower surface of the rear fastening part 52, whereby the turning of the side stand 41 in the storing direction is restricted. In other words, the rear fastening part 52 functions also as a stopper for restricting the turning of the side stand 41 in the storing direction at the time of storage thereof.

The rear fastening part 52 is provided to be displaced upward in relation to the front fastening part 51, attendant on the upward displacement of the rear boss 47 in relation to the front boss 46. This makes it possible to set large the turning angle of the side stand 41 in the storing direction, thereby to displace more upward the side stand 41, particularly the grounding part 57 on the tip side, in the stored state, so as to suppress the influence thereof on the bank angle of the vehicle body.

As has been described above, the side stand attaching structure in the above-described embodiment, which is applied to the motorcycle 1 equipped with the levelable type side stand 41 on the left side of a lower part of the body frame 5, is so configured that the stand bracket 43 for turnably supporting the base end part 42 of the side stand 41 is provided as a body separate from the stand attaching part 44 of the body frame 5, and the stand bracket 43 is attached to the stand attaching part 44 by the front and rear bosses 46, 47 and the fastening bolts B which are inclined so as to be located on the more upper side as one goes toward the outer side of the vehicle body in the vehicle width direction.

This configuration ensures that the stand bracket 43 is displaced toward an upper and outer side in the left-right direction in relation to the stand attaching part 44 of the body frame 5, the positions of the stand bracket 43 and the base end part 42 of the side stand 41 can be changed toward the upper side while permitting the stand bracket 43 to be fastened from the lateral side of the vehicle body, and the bank angle of the vehicle body can be secured favorably.

In addition, since the turning shaft of the side stand 41 is disposed in the state of being inclined so as to be located on the more upper side as one goes toward the outer side in the left-right direction (the outer side in the vehicle width direction), the stand bracket 43 as a whole can be made to be in a flat plate-like shape orthogonal to the turning shaft, so that the stand bracket 43 can be manufactured easily.

Besides, in the side stand attaching structure as above, the stand bracket 43 is fastened to the stand attaching part 44 at a plurality of positions (the front and rear fastening parts 51, 52) mutually spaced in the front-rear direction, and the rear-side fastening position (the rear fastening part 52) is displaced toward the upper side in relation to the front-side fastening position (the front fastening part 51). This makes it possible to set large the turning angle of the side stand 41 folded by turning rearwardly upwards, and to displace more upwards the side stand 41, particularly the tip side thereof, in the stored state. Accordingly, the bank angle of the vehicle body can be secured favorably.

Furthermore, in the side stand attaching structure as above, the base end part 42 of the side stand 41 is supported on the intermediate part in the front-rear direction of the stand bracket 43 through the turning shaft (the stepped bolt 61), and the stand attaching part 44 is provided at its intermediate part in the front-rear direction with the recess 62 for avoiding the projected part of the turning shaft projected from the stand bracket 43. This makes it possible to set the stand attaching part 44 and the stand bracket 43 close to each other, thereby suppressing the projection of the stand bracket 43 toward the outer side in the left-right direction, and to favorably secure the bank angle of the vehicle body.

Incidentally, the present invention is not limited to the above-described embodiment. For example, the attaching position of the side stand may be modified variously according to the type of the body frame. For instance, the side stand may be attached to a swing arm pivot part or the like or, further, may be attached to the main body of the engine. In addition, a configuration may be adopted in which three or more portions mutually spaced in the front-rear direction of the stand bracket may be fastened to the vehicle body. Further, the present invention can be applied also to the case where the side stand is provided on the right side of the vehicle body.

Besides, the configuration in the above-described embodiment is merely one example of the present invention, and the invention can naturally be applied to a motor scooter type motorcycle having a low-floor foot rest part. Moreover, various modifications inclusive of modifications in the configu-

What is claimed as New and Desired to be Secured by Letters Patent of the United States is:

1. A side stand attaching structure for a motorcycle, comprising:
   a stand attaching part of a body of the motorcycle;
   a stand bracket to rotatably connect a base end part of a levelable side stand to the stand attaching part, the side stand being provided on one side at a lower part of the body;
   a first boss portion fixed to the stand attaching part and inclined to extend upward as the first boss portion extends outwardly in a width direction of the motorcycle;
   a first connecting member attached to the first boss portion to connect the stand bracket to the first boss portion, the first connecting member being inclined to extend upward as the first connecting member extends outwardly in the width direction of the motorcycle;
   a second boss portion fixed to the stand attaching part and inclined to extend upward as the second boss portion extends outwardly in the width direction of the motorcycle; and
   a second connecting member attached to the second boss portion to connect the stand bracket to the second boss portion, the second connecting member being inclined to extend upward as the second connecting member extends outwardly in the width direction of the motorcycle,
   wherein the stand bracket is entirely planar in shape,
   wherein the first boss portion extends along a first center axis from the stand attaching part, the first center axis being inclined with respect to the width direction of the motorcycle,
   wherein the first connecting member extends along the first center axis,
   wherein the second boss portion extends along a second center axis from the stand attaching part, the second center axis being inclined with respect to the width direction of the motorcycle, and
   wherein the second connecting member extends along the second center axis.

2. The side stand attaching structure according to claim 1, wherein the second boss portion is positioned above the first boss portion and rearward with respect to the first boss portion in a front-rear direction of the motorcycle.

3. The side stand attaching structure according to claim 1, wherein the stand bracket includes a stopper that projects downwardly and is configured to restrict rotation of the base end part of the side stand.

4. The side stand attaching structure according to claim 1, wherein
   the first boss portion includes an end face abutting with the stand bracket,
   the second boss portion includes an end face abutting with the stand bracket, and
   the end face of the first boss portion and the end face of the second boss portion are on a same virtual plane.

5. The side stand attaching structure according to claim 1, wherein
   the stand bracket is interposed between the first connecting member and the first boss portion.

6. The side stand attaching structure according to claim 1, wherein
   the first center axis is parallel to the second center axis.

7. The side stand attaching structure according to claim 1, wherein
   the stand bracket is inclined to extend downward as the stand bracket extends outwardly in the width direction of the motorcycle.

8. A side stand attaching structure for a motorcycle, comprising:
   a stand attaching part of a body of the motorcycle;
   a stand bracket to rotatably connect a base end part of a levelable side stand to the stand attaching part, the side stand being provided on one side at a lower part of the body; and
   a connector to connect the stand bracket to the stand attaching part, the connector being inclined to extend upward as the connector extends outwardly in a width direction of the motorcycle,
   wherein the base end part of the side stand is connected via a turning shaft to an intermediate part of the stand bracket in a front-rear direction of the motorcycle, and
   wherein the stand attaching part is provided with a recess not to contact a projected part of the turning shaft projected from the stand bracket.

9. A motorcycle comprising:
   a body having a stand attaching part;
   a levelable side stand provided on one side at a lower part of the body and having a base end part;
   a stand bracket rotatably connecting the base end part of the side stand to the stand attaching part;
   a first boss portion fixed to the stand attaching part and inclined to extend upward as the first boss portion extends outwardly in a width direction of the motorcycle;
   a first connecting member attached to the first boss portion to connect the stand bracket to the first boss portion, the first connecting member being inclined to extend upward as the first connecting member extends outwardly in the width direction of the motorcycle;
   a second boss portion fixed to the stand attaching part and inclined to extend upward as the second boss portion extends outwardly in the width direction of the motorcycle; and
   a second connecting member attached to the second boss portion to connect the stand bracket to the second boss portion, the second connecting member being inclined to extend upward as the second connecting member extends outwardly in the width direction of the motorcycle,
   wherein the stand bracket is entirely planar in shape,
   wherein the first boss portion extends along a first center axis from the stand attaching part, the first center axis being inclined with respect to the width direction of the motorcycle,
   wherein the first connecting member extends along the first center axis,
   wherein the second boss portion extends along a second center axis from the stand attaching part, the second center axis being inclined with respect to the width direction of the motorcycle, and
   wherein the second connecting member extends along the second center axis.

10. The motorcycle according to claim 9, further comprising:
   a second boss portion fixed to the stand attaching part and inclined to extend upward as the second boss portion extends outwardly in the width direction of the motorcycle; and a second connecting member attached to the second boss portion to connect the stand bracket to the second boss portion, the second connecting member being inclined to extend upward as the second connecting member extends outwardly in the width direction of the motorcycle.

11. The motorcycle according to claim 10, wherein the second boss portion is positioned above the first boss portion and rearward with respect to the first boss portion in a front-rear direction of the motorcycle.

12. The motorcycle according to claim 9, wherein the stand bracket includes a stopper that projects downwardly and is configured to restrict rotation of the base end part of the side stand.

13. A method for attaching a levelable side stand to a motorcycle, the method comprising:
    connecting a stand bracket to a first boss portion by attaching a first connecting member to the first boss portion, the first boss portion being fixed to a stand attaching part of a body of the motorcycle and being inclined to extend upward as the first boss portion extends outwardly in a width direction of the motorcycle;
    connecting the stand bracket to a second boss portion by attaching a second connecting member to the second boss portion, the second boss portion being fixed to the stand attaching part and being inclined to extend upward as the second boss portion extends outwardly in the width direction of the motorcycle;
    arranging the first connecting member to incline so that the first connecting member extends upwardly as the first connecting member extends outwardly in a width direction of the motorcycle;
    arranging the second connecting member to incline so that the second connecting member extends upwardly as the second connecting member extends outwardly in the width direction of the motorcycle; and
    rotatably connecting a base end part of the side stand to the stand bracket, the side stand being provided on one side at a lower part of the body,
    wherein the stand bracket is entirely planar in shape,
    wherein the first boss portion extends along a first center axis from the stand attaching part, the first center axis being inclined with respect to the width direction of the motorcycle,
    wherein the first connecting member extends along the first center axis,
    wherein the second boss portion extends along a second center axis from the stand attaching part, the second center axis being inclined with respect to the width direction of the motorcycle, and
    wherein the second connecting member extends along the second center axis.

14. The method according to claim 13, further comprising:
    connecting the stand bracket to a second boss portion by attaching a second connecting member to the second boss portion, the second boss portion being fixed to the stand attaching part and being inclined to extend upward as the second boss portion extends outwardly in the width direction of the motorcycle; and
    arranging the second connecting member to incline so that the second connecting member extends upwardly as the second connecting member extends outwardly in a width direction of the motorcycle.

15. The method according to claim 14, wherein the second boss portion is arranged to be positioned above the first boss portion and rearward with respect to the first boss portion in a front-rear direction of the motorcycle.

16. The method according to claim 13, wherein the stand bracket includes a stopper that projects downwardly and is configured to restrict rotation of the base end part of the side stand.

17. A motorcycle comprising:
    a body having a stand attaching part;
    a levelable side stand provided on one side at a lower part of the body and having a base end part;
    a stand bracket rotatably connecting the base end part of the side stand to the stand attaching part; and
    a connector connecting the stand bracket to the stand attaching part, the connector being inclined to extend upward as the connector extends outwardly in a width direction of the motorcycle,
    wherein the base end part of the side stand is connected via a turning shaft to an intermediate part of the stand bracket in a front-rear direction of the motorcycle, and
    wherein the stand attaching part is provided with a recess not to contact a projected part of the turning shaft projected from the stand bracket.

18. A method for attaching a levelable side stand to a motorcycle, the method comprising:
    connecting a stand bracket to a stand attaching part of a body of the motorcycle via a connector;
    arranging the connector to incline so that the connector extends upwardly as the connector extends outwardly in a width direction of the motorcycle; and
    rotatably connecting a base end part of the side stand to the stand bracket, the side stand being provided on one side at a lower part of the body,
    wherein the base end part of the side stand is connected via a turning shaft to an intermediate part of the stand bracket in a front-rear direction of the motorcycle, and
    wherein the stand attaching part is provided with a recess not to contact a projected part of the turning shaft projected from the stand bracket.

* * * * *